United States Patent [19]

Stefanakis

[11] Patent Number: 4,930,409
[45] Date of Patent: Jun. 5, 1990

[54] EGG STORING AND PROCESSING MACHINE

[76] Inventor: Stamatios Stefanakis, 68 Brandy La., Lake Grove, N.Y. 11755

[21] Appl. No.: 286,931

[22] Filed: Dec. 20, 1988

[51] Int. Cl.⁵ .......................... A23B 5/00; B01F 15/06
[52] U.S. Cl. ........................................ 99/484; 62/258; 62/331; 62/382; 99/348; 366/144; 366/279
[58] Field of Search ............... 366/144, 129, 279, 150, 366/193, 192, 194; 99/348, 468, 495, 484; 62/331, 258, 440, 404, 382; 222/146.6, 504

[56] References Cited

U.S. PATENT DOCUMENTS

| | | | |
|---|---|---|---|
| 2,269,254 | 1/1942 | Cribb | 99/495 |
| 2,588,618 | 3/1952 | DiRenzo | 62/382 X |
| 2,711,944 | 6/1955 | Meek et al. | 62/382 X |
| 2,926,507 | 3/1960 | Ingolia | 62/382 X |
| 3,075,366 | 1/1963 | Jung | 62/382 |
| 4,233,891 | 11/1980 | Schindler et al. | 99/348 |
| 4,522,117 | 6/1985 | Weimer et al. | 99/348 |
| 4,681,030 | 7/1987 | Herbert | 99/484 |

FOREIGN PATENT DOCUMENTS

| | | | |
|---|---|---|---|
| 0285552 | 10/1988 | European Pat. Off. | 99/484 |
| 2604882 | 4/1988 | France | 99/484 |

Primary Examiner—Harvey C. Hornsby
Assistant Examiner—Stephen F. Gerrity
Attorney, Agent, or Firm—Michael I. Kroll

[57] ABSTRACT

The egg storing and processing appliance comprises a single-piece casing, a storage drawer for eggs, a refrigeration system to preserve the eggs in the storage drawer and a dispensing and metering system for delivering a timed series of consecutive measured portions of eggs having an egg breaker immediately above a sieve for egg shells, a motor-driven mixer located immediately below the sieve and a funnel hopper located immediate below the mixer with a reciprocating substantially horizontal hopper door and with a door drive mechanism for measuring the egg portions, a dispensing spout connected to the funnel hopper outlet and a control unit for the door drive mechanism and the mixer.

5 Claims, 1 Drawing Sheet

EGG STORING AND PROCESSING MACHINE

THE FIELD OF THE INVENTION

The invention relates to an appliance for use in a restaurant or kitchen and, more particularly, to a food storing and processing machine.

THE BACKGROUND OF THE INVENTION

Preparation of servings or portions of eggs in a restaurant or other food serving organization must be done quickly but according to Board of Health Rules and other food preparation standards. In particular eggs should not be allowed to stand out on a counter more than three or four minutes before they are used. At all other times they should be kept under refrigeration. Normally this is not done in the typical restaurant despite rules to the contrary because of a desire to save time and to reduce the number of times the large refrigeration unit used to store food is opened and closed.

Furthermore currently there is no rapid way to accurately provide the same serving or portion of eggs by weight because the weight of individual eggs varies.

It is an object of the invention to provide an egg storing and processing machine for use in a restaurant or other food preparing and serving organization serving a substantial number of individuals rapidly.

It is also an object of the invention to provide an egg storing and processing machine for use in a restaurant which can store a substantial number of eggs in a manner consistent with accepted food preparation standards and laws but ready for rapid use in daily food preparation.

It is another object of the invention to provide an egg storing and processing machine for use in a restaurant which can safely meter a predetermined number of servings of eggs which each contain a measured amount of eggs.

It is a general object of the invention to provide an appliance for more rapid, more accurate and more safe mass production of servings or portions of eggs than the current methods and apparatus allow.

SUMMARY OF THE INVENTION

According to the instant invention the egg storing and processing machine comprises a casing or housing, a storage drawer for eggs supported slidably in the casing, a dispensing and metering system for delivering a timed series of consecutive measured portions of eggs and a refrigeration system to preserve the eggs in the storage drawer.

The dispensing and metering system can include an egg breaker mounted immediately above a sieve provided with a plurality of holes of a mesh size such that the sieve retains egg shell fragments of the eggs, a mixer located immediately below the sieve and a funnel hopper connected immediately below the mixer with a reciprocating substantially horizontal hopper door and with a door drive mechanism for metering the portions of eggs. A dispensing spout is connected to the outlet of the funnel hopper and a control unit is connected to the door drive mechanism and the mixer.

The mixer advantageously includes a beater mounted centrally in a tubular mixer housing inside the casing. This beater is driven by a mixer motor and associated motor controller. The mixer motor is connected to the the beater by a drive belt-pulley system.

The door drive mechanism comprises a door drive motor connected to and controlled by the control unit for delivery of the timed series of measured egg portions and an eccentric drive connecting the door drive motor to the hopper door converting the rotary motion of the door drive motor into a linear displacement of the hopper door. A series of switch buttons are provided on the control unit which differ according to the time interval the hopper door is held open and hence the size of the portion of eggs allowed to pass through the funnel hopper. There is a built-in time delay between the delivery of egg portions so that when a series of egg portions are to be produced in succession the size of the portions are simply punched consecutively on the control unit.

The refrigeration system is housed in the casing adjacent the storage drawer and has a compressor and refrigeration coils.

The egg storing and processing appliance of the instant invention allows eggs to be stored in a manner consistent with food preservation standards in a restaurant serving a large number of orders requiring accurately measured portions of eggs. These orders can be filled rapidly and safely.

BRIEF DESCRIPTION OF THE DRAWING FIGURES

FIG. 3 is a cutaway cross sectional view of an upper portion of the egg storing and processing machine of FIG. 1.

FIG. 4 is a side elevational view of the mechanism of the egg storing and processing machine shown in FIG. 1 exposed by removing portions of the side wall of the egg storing and processing machine.

FIG. 5 is a perspective view of parts of the egg dispensing and metering mechanism of the egg storing and processing machine of FIG. 1.

DETAILED DESCRIPTION OF THE INVENTION

Figure 1:
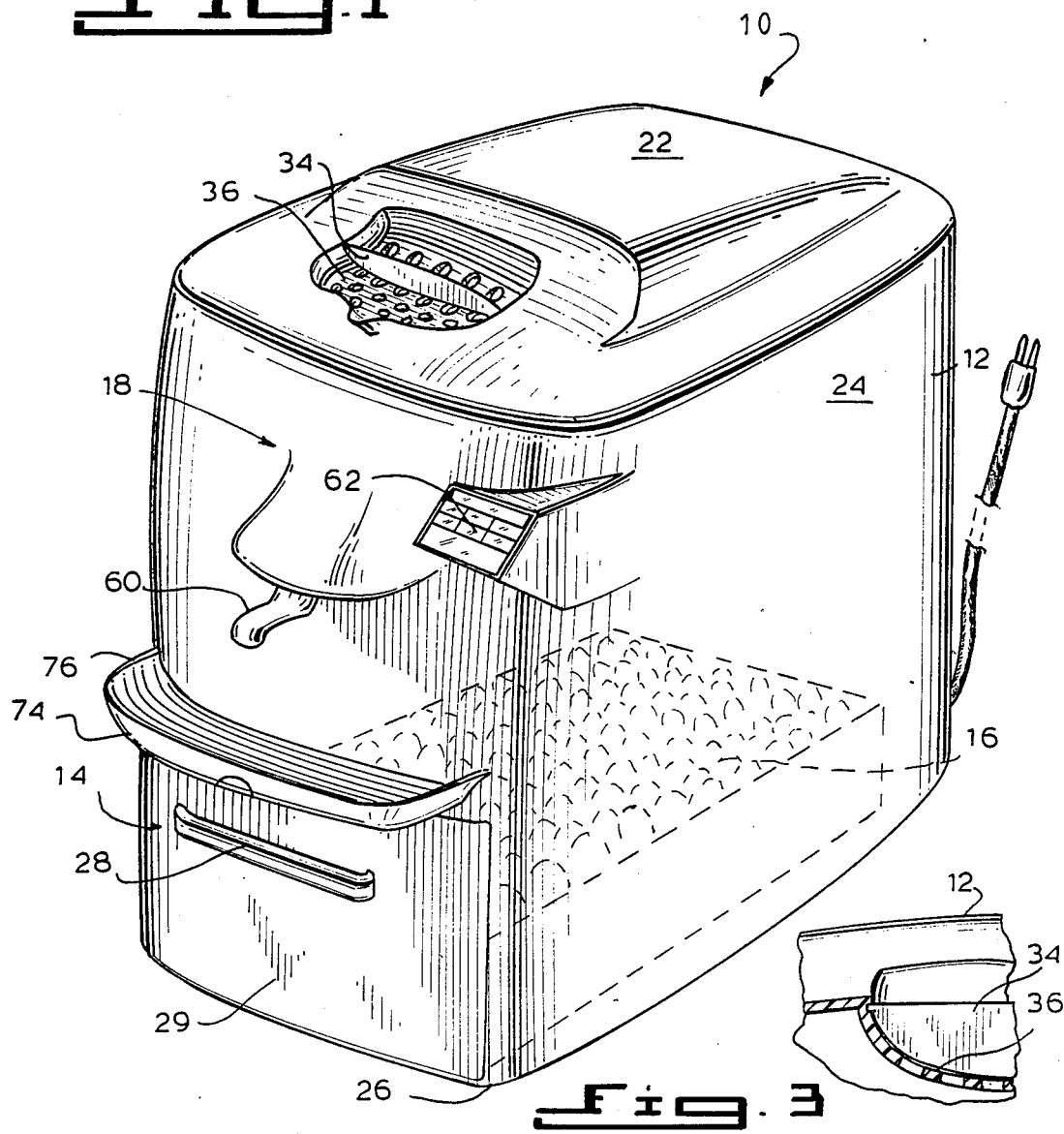
FIG. 1 is a perspective view of an egg storing and processing machine according to the invention.

The egg storing and processing machine 10 shown in FIGS. 1 to 5 comprises a housing 12, a storage drawer 14 disposed in the housing 12 is for eggs 16, a dispensing and metering system 18 and a refrigeration system 20.

The housing 12 which appears in perspective in FIG. 1 has a top covering portion 22, four substantially rectangular side walls 24 and a base 26. The edges of the casing 12 may be rounded and may be molded, cast or otherwise formed as a single piece. There is a rectangular opening 23 in the bottom front side wall 24 through which the storage drawer 14 slides. This storage drawer 14 has a drawer handle 28 on its front panel 29 which fits tightly against the front side wall 24 when the drawer 14 is closed. This storage drawer 14 otherwise is a conventional rectangular cross sectioned drawer in which a large number of eggs 16 are stored.

The refrigeration system 20 is a conventional refrigeration system similar to that used in small convenience refrigerator units used in bedrooms and has a compressor 30 and a set of refrigeration coils 32 as well as other components which are conventional and have not been shown.

Figure 2:
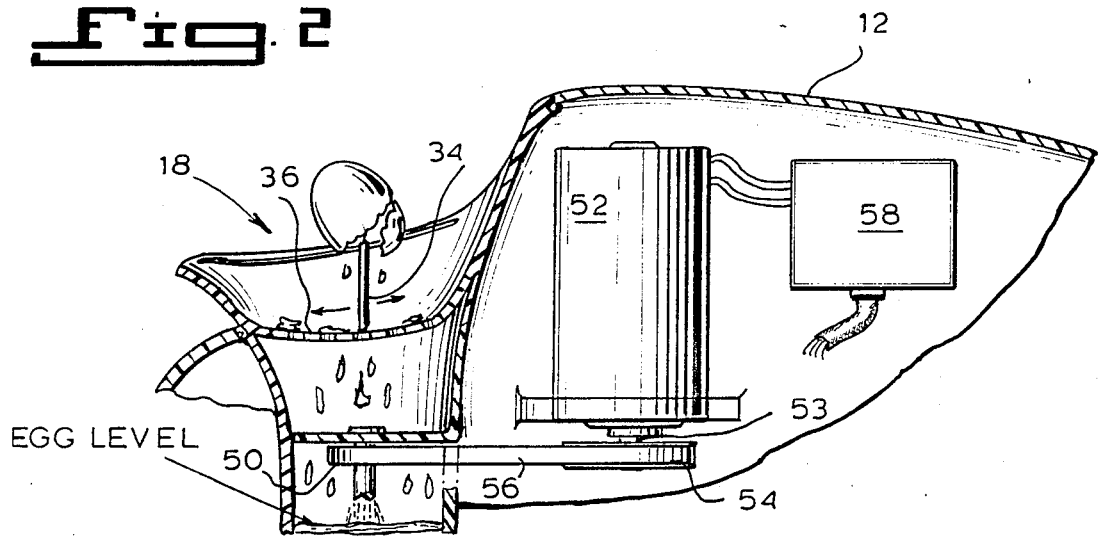
FIG. 2 is a cutaway vertical cross sectional view of the upper portion of the egg storing and processing machine of FIG. 1.

The dispensing and metering system 18 is shown particularly in FIGS. 2, 4 and 5. It comprises an egg breaker 34 mounted immediately above a sieve 36 having holes of a mesh size so that it retains egg shell fragments, a mixer 44 located immediately below the sieve 36, a funnel hopper 38 with a reciprocating hopper door 39 and a door drive mechanism 40 below the mixer 44 for metering the egg portions and a dispensing spout 60 connected to the outlet side of the funnel hopper 38. A control unit 62 for the mixer 44 and the door drive mechanism 40 is also provided.

The mixer 44 includes a beater 46 mounted centrally in a tubular mixer housing 48 having a beater pulley 50 mounted approximately coaxially on its upper end. A mixer motor 52 with a drive motor pulley 54 approximately coaxially mounted to the drive shaft 53 of the mixer motor 52 drives the beater 46 with a drive belt 56 which is engaged with the drive motor pulley 54 and the beater pulley 50. A motor controller 58 and power cord are also provided.

The dispensing and metering system 18 provides a measured portion of eggs by opening the hopper door 39 of the funnel hopper 38 for a predetermined time interval controlled by the control unit 62 which has a series of switch buttons 63 for selecting the size of the portion. The switch buttons 63 select a time interval in which the door drive mechanism 40 is on. The door drive mechanism 40 opens the reciprocating hopper door 39 which is positioned horizontally and is slidable horizontally. The hopper door 39 closes the funnel hopper 38 when the door drive mechanism 40 is off but opens it when it is on.

The door drive mechanism 40 can be a door drive motor 66 which has an eccentric drive 65 converting its rotary motion into linear motion of the hopper door 39. Alternatively other conventional means may be used including solenoids and the like. The control unit 62 turns the door drive mechanism 40 on only for a predetermined time interval determined by the button 63 which has been pressed and then sets a time delay preventing activation of the closed door for a built-in time interval. Pressing another button 63 afterwards produces another serving of a different size after this built-in time interval.

A connecting pipe 72 is provided between the funnel hopper 38 and the dispensing spout 60.

A substantially horizontally extending shelf 74 with an upwardly protruding lip 76 is attached to the front side wall 24 immediately above the storage drawer 14 and below the dispensing spout 60. This shelf can be used to catch droppings from the dispensing spout 60, as a rest for receptacles or dishes which receive the egg portions from the egg storing and processing machine 10 and as a handle by which the entire machine may be moved.

The egg storing and processing machine 10 can be operated according to the following:

First of all the machine can be used simply as a refrigeration unit for storing eggs 16. A number of eggs 16 are placed in the drawer 14 which is tightly shut. Eggs 16 can be taken from the drawer 14 as desired and used in foods. This alone can save power which would be consumed if a larger refrigeration unit for meat and other foods was used.

When a large number of orders for egg portions are placed the appropriate number of eggs is taken from the refrigeration unit by opening the storage drawer 14 and removing them. The eggs are all rapidly broken on the egg breaker 34 and the yolks and whites drop through the sieve 36. The mixer 44 is turned on as desired using the appropriate button on the control unit 62. The shell pieces are removed from the sieve 36 as necessary. Then nearly at the same time the number of eggs required for each portion is entered by punching the switch buttons 63 of the control unit 62 in succession. The hopper door 39 then opens for a time interval sufficient for the first egg portion to drop through the funnel hopper 38 and subsequently through the dispensing spout 60 into a waiting receptacle. Following that the hopper door 39 is automatically closed for an interval allowing receptacles to be switched. The second egg portion is 20 then is metered by opening the hopper door 39 for a time interval determined by which switch button 63 on the control unit 62 has been selected and it drops through the dispensing spout 60 into the waiting receptacle. Thus a rapid delivery of an accurately measured series of egg portions is provided safely in a situation where a large number of orders has been placed in a short time.

The egg breaker 34 in this embodiment comprises a substantially vertical blade like plate mounted above the sieve 36 but can also be a prong or any solid body on which an egg can be broken.

LIST OF REFERENCE NUMBERS

10: egg storing and processing machine
12: casing
14: storage drawer
16: eggs
18: dispensing and metering system
20: refrigeration system
22: top covering portion
24: side wall
26: base
28: drawer handle
29: front panel
30: compressor
32: refrigeration coils
34: egg breaker
36: sieve
38: funnel hopper
39: hopper door
40: door drive mechanism
44: mixer
46: beater
48: mixer housing
50: beater pulley
52: mixer motor
53: drive shaft
54: drive motor pulley
56: drive belt
58: motor controller
60: dispensing spout
62: control unit
63: switch button
65: eccentric drive
66: door drive motor (for door drive mechanism 40)
72: connecting pipe
74: shelf
76: upwardly protruding lip It will be understood that each of the elements described above, or two or more together, may also find a useful application in other types of methods and apparatus differing from the type described above.

While certain novel features of this invention have been shown and described and are pointed out in the annexed claims. it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, for the standpoint of prior art, fairly constitute essential characteristics of the generic or specific aspects of this invention.

What is claimed as new and desired to be protected by Letters Patent is set forth in the appended claims:

1. An egg storing and processing machine, comprising:
  (a) a housing, having a bottom and a top covering portion disposed at an uppermost surface of said housing;
  (b) a storage drawer disposed in said housing for storing unshelled eggs;
  (c) a refrigeration system within said housing to preserve said unshelled eggs stored in said storage drawer;
  (d) a means on and within said housing for dispensing and metering consecutively measured portions of shelled eggs comprising a sieve, an eggshell breaker mounted below said top covering portion and above said sieve, said sieve provided with a plurality of holes of a mesh size so that said sieve retains eggshell fragments from unshelled eggs broken on said eggshell breaker, but permits shelled egg fluid passage, a mixer located below and in fluid communication with said sieve and above said bottom of said housing, a funnel hopper located below and in fluid communication with said mixer and above said bottom of said housing, said funnel hopper having a reciprocating substantially horizontal hopper door disposed therein and below said mixer and above said bottom of said housing, a hopper door reciprocating mechanism to open and close the hopper door to permit metering of said portions of said shelled eggs, a dispensing spout connected to and in fluid communication with said funnel hopper; and
  (e) a time control unit connected to said door mechanism to activate said door mechanism to open said hopper door for a predetermined time to permit a predetermined portion of shelled eggs to be metered and dispensed, and to activate said door mechanism to close said hopper door when said predetermined time has elapsed.

2. An egg storing and processing machine according to claim 1 in which said mixer includes a beater mounted centrally in a tubular mixer casing inside said housing, said beater being driven by a mixer motor and associated motor controller, said mixer motor being connected to said beater by a belt drive.

3. An egg storing and processing machine according to claim 2 in which the mechanism opens the door to permit metering and comprises a door drive rotary motor having rotary motion and being connected to and controlled by said time control unit for delivery of measured skilled egg portions and an eccentric drive connecting said door drive rotary motor to said hopper door converting said rotary motion of said door drive motor into a reciprocating displacement of said hopper door.

4. An egg storing and processing machine according to claim 3 in which said refrigeration system is mounted in said housing adjacent said storage drawer and has a compressor and refrigeration coils.

5. An egg storing and processing machine, comprising:
  (a) a housing having a bottom and a top covering portion;
  (b) a storage drawer disposed in said housing for storing unshelled eggs that is slidably supported in said housing;
  (c) a refrigeration system within said housing including a compressor and a set of refrigeration coils to preserve said eggs in said storage drawer;
  (d) a means for dispensing and metering consecutively measured portions of shelled eggs including a sieve, an egg shell breaker mounted below said top covering portion and above said sieve, said sieve provided with a plurality of holes of a mesh size so that said sieve retains egg shell fragments from unshelled eggs broken on said eggshell breakes, but permits shelled egg fluid passage
  (e) a mixer located below and is fluid communication said sieve and above said bottom of said housing and having a beater mounted centrally in a tubular mixer casing inside said housing, said beater being driven by a mixer motor and associated motor controller said mixer motor driving said beater through a drive belt, a funnel hopper located below and in fluid communication with said mixer and above said bottom of said housing, said funnel hopper having a hopper door disposed therein and below said mixer and above said bottom of said housing, a hopper door mechanism to open and close the door to permit metering of said portions of said shelled eggs, a dispensing spout connected to and in fluid communication in said funnel hopper; and
  (f) a time control unit connected to said door mechanism to open the door to permit metering of a measured portion of said shelled eggs by opening the hopper door of the funnel hopper for a predetermined time interval said time control unit closes the door mechanism after a predetermined time interval.

* * * * *